UNITED STATES PATENT OFFICE.

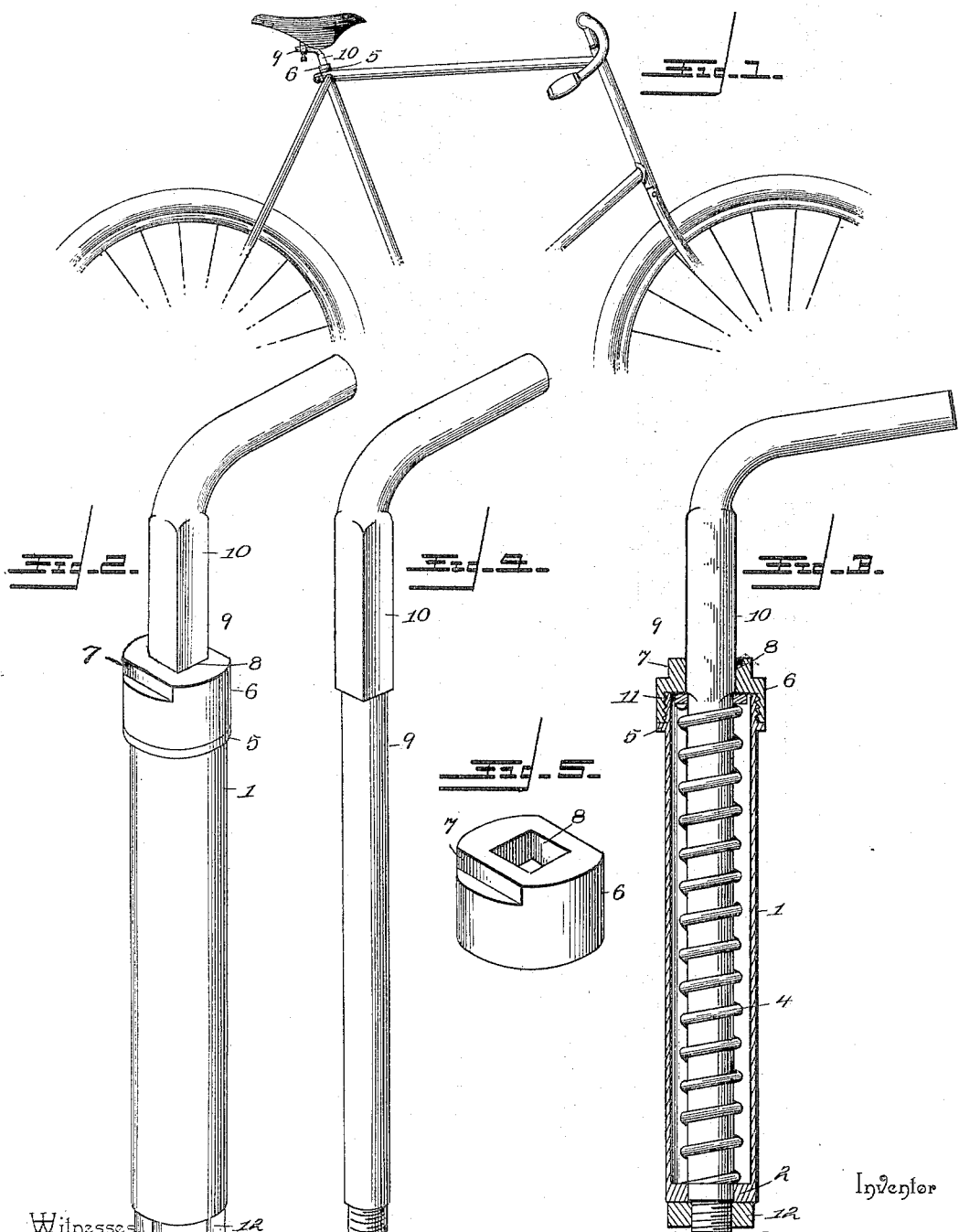

JOEL B. L. McKENZIE, OF RAHWAY, NEW JERSEY.

SADDLE-POST FOR BICYCLES.

SPECIFICATION forming part of Letters Patent No. 640,483, dated January 2, 1900.

Application filed November 29, 1895. Serial No. 570,505. (No model.)

*To all whom it may concern:*

Be it known that I, JOEL B. L. McKENZIE, a citizen of the United States, residing at Rahway, in the county of Union and State of New Jersey, have invented a new and useful Saddle-Post for Bicycles, of which the following is a specification.

This invention relates to an improvement in bicycles, and has special reference to the construction of the saddle-posts thereof.

The object of the present invention is to provide a simple, light, and efficient saddle-post in which provision is made for supporting the post proper yieldingly, so that it may give beneath the weight of the rider while traveling over rough roads and prevent the vibration of the machine from being communicated to such rider, the said saddle-post being adapted to be manufactured and sold separately from the machine and to be applied to any ordinary make of bicycle in lieu of the ordinary saddle-post.

To this end the invention consists in certain novel features and details of construction and arrangement of parts, as hereinafter fully described, illustrated in the drawings, and finally pointed out in the claim.

In the accompanying drawings, Figure 1 is a side elevation of a sufficient portion of a bicycle to illustrate the application of the present improvement thereto. Fig. 2 is an enlarged perspective view of the improved saddle-post. Fig. 3 is a longitudinal section through the improved saddle-post complete. Fig. 4 is a detail perspective view of the saddle-post proper. Fig. 5 is a similar view of the removable cap of the socket member.

Similar numerals of reference designate corresponding parts in the several figures of the drawings.

Referring to the accompanying drawings, 1 designates the socket member of the improved device, which consists of a tubular case or barrel of any desired length provided at its lower end with an inwardly-extending annular flange 2, forming an internal shoulder which constitutes the lower seat, upon which a coiled spring 4 rests. At or near the upper end of the tubular socket 1 is formed a circumferential flange 5, and above this flange the tubular socket is threaded to receive a removable cap or nut 6, formed with wrench-engaging surfaces 7 and having a squared aperture 8.

9 designates the seat-post proper, which resembles in form the ordinary seat-post in common use, with the exception that it is provided at its upper portion, adjacent to the horizontal seat-holding part, with an enlarged and squared intermediate portion or shank 10, adapted to slide within and through the square aperture in the removable cap 6, above referred to. The squared portion of the post 9 is made of sufficient longitudinal extent to accommodate the desired amount of vertical reciprocation and is made sufficiently thicker than the end portions of the post to form a shouldered seat for an annular washer or collar 11, which is located just beneath the squared portion and adapted to bear upon the upper end of the supporting-spring 4, while the lower extremity of the post 9 passes through the lower end of the tubular socket 1 and is threaded to receive a nut 12, which bears beneath said tubular socket and prevents the displacement of the post 9 and also affords means for adjusting the tension of the spring 4. The washer or collar may be dispensed with and the spring allowed to bear directly under the shoulder formed by the squared shank 10. It will thus be seen that while the saddle-post proper is permitted to reciprocate vertically it is prevented against turning by reason of the engagement between its squared portion 10 and the cap 6 of the tubular socket.

The complete saddle-post, embracing all of the parts above referred to, is manufactured and intended to be sold independently of any make of machine, as it is adapted to be applied to any ordinary bicycle of the present day. The tubular socket 1 is made of such size as will adapt it to be inserted into the seat-post socket of the seat-post cluster of a safety-bicycle and to be clamped therein in a manner similar to the ordinary seat-post and also to be adjusted in height in the same manner.

The device herein described does away with the use of spring-saddles and admits of the use of a light rigid saddle, which is especially desirable on account of its relative lightness. In addition to this the saddle is always preserved in the same shape and does not sink in the middle in order to permit of spring action, as in the ordinary spring-saddle. This device also admits of greater elasticity than the ordinary spring-saddle, and at the same time the means which admit of this action are entirely concealed and their presence in no wise suggested.

Various changes in the form, proportion, and minor details of construction may be resorted to without departing from the spirit or sacrificing any of the advantages of this invention.

In my improvement the sliding stem is housed or contained within the tube to slide freely therein under the weight of the saddle and the recoil of the spring, and the nut 12 is screwed to the stem to lie within the edges of the flange 2 and the cylindrical face of the tube. The upper end of the tube has an annular shoulder or flange below the threaded part thereof, and to this threaded part of the tube is screwed a cap, which abuts against the shoulder to be limited thereby. This cap is screwed on the tube to have tight frictional engagement with the collar 5, and thus hold the cap in place to prevent it from rotating or turning, which is important, because the cap is better able to serve as a guide to the slidable part or stem, so as to hold the latter in place and prevent the saddle from turning out of position with relation to the plane of the bicycle.

My attachment is made and sold complete as an article of manufacture to be applied to ordinary bicycles of any suitable character, and said attachment is designed to have its tube 1 clamped by the usual devices in a seat-post socket of the bicycle-frame, so that the cap and angular end of the stem will project above the seat-post cluster.

Having thus described the invention, what is claimed as new is—

The combination with a bicycle-frame including a seat-tube, of a socket formed integral and adapted to slidably fit the seat-tube, a perforation in the bottom of the socket, external threads upon the upper end of the socket, an annular flange adjacent the upper end of the socket and extending outwardly and radially thereof at the base of the threaded portion, a threaded cap engaging the threads of the socket and having a central angular opening, said cap being adapted to engage the flange of the socket to jam the cap in place, an integral seat-support passed into the socket and having a squared upper portion fitting the opening in the cap and adapted for slidable movement therein, the support being bent laterally above the squared portion to limit the movement of the support in one direction with respect to the cap, said support having its lower end passed through the perforation in the bottom of the socket and threaded, a nut engaged with the threaded portion of the support below the socket, a collar disposed upon the support and bearing against the squared portion thereof, and a helical spring surrounding the support and bearing at its upper end against the collar and at the lower end against the bottom of socket and adapted to hold the support yieldably with the nut against the bottom of the socket.

In testimony that I claim the foregoing as my own I have hereto affixed my signature in the presence of two witnesses.

JOEL B. L. McKENZIE.

Witnesses:
ROBERT A. HETHERINGTON,
ALBERT DE GROOTE.